US012781925B2

(12) United States Patent
Van Bommel et al.

(10) Patent No.: US 12,781,925 B2
(45) Date of Patent: Nov. 3, 2026

(54) LED FILAMENT LAMP PROVIDING POLARIZED LIGHT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 19/152,029

(22) PCT Filed: Jan. 29, 2024

(86) PCT No.: PCT/EP2024/052038
§ 371 (c)(1),
(2) Date: Jul. 30, 2025

(87) PCT Pub. No.: WO2024/165350
PCT Pub. Date: Aug. 15, 2024

(65) Prior Publication Data

US 2026/0227039 A1 Aug. 6, 2026

(30) Foreign Application Priority Data

Feb. 6, 2023 (EP) .................................... 23155026

(51) Int. Cl.
*F21K 9/232* (2016.01)
*F21K 9/235* (2016.01)
*F21Y 115/10* (2016.01)

(52) U.S. Cl.
CPC .............. *F21K 9/232* (2016.08); *F21K 9/235* (2016.08); *F21Y 2115/10* (2016.08)

(58) Field of Classification Search
CPC ....................... F21K 9/23–238; F21Y 2115/10
See application file for complete search history.

(56) References Cited

U.S. PATENT DOCUMENTS 11,739,885 B2 * 8/2023 Van Bommel .......... F21K 9/232 362/249.02
2013/0155645 A1 6/2013 Marius
2015/0101246 A1 4/2015 Usami et al.
2017/0059119 A1 3/2017 Bennett et al.

FOREIGN PATENT DOCUMENTS

CN 205806977 U 12/2016
CN 114526454 A 5/2022
WO 2022189150 A1 9/2022

* cited by examiner

*Primary Examiner* — Jason M Han

(57) ABSTRACT

The field of the present invention is a LED filament lamp (7) for illumination wherein at least one LED filament lamp (7) is configured to emit a polarized light. The LED filament lamp (7) comprises at least one LED filament (1) and an encapsulated volume (V) having an envelope (10) comprising a light exit window, inside of which the LED filament (1) is arranged. The LED filament (1) or LED filaments (11,12) comprises a plurality of LEDs (3) arranged on a filament carrier (2). At least one polarizer (5) is arranged relative to the LED filament (1). The polarizer (5) is configured to provide a polarization direction of light. The polarizer (5) encloses or partially encloses the at least one LED filament (1), such that the light or part of the light emitted from the LED filament lamp (7) may be polarized light or non-polarized.

15 Claims, 3 Drawing Sheets

LED FILAMENT LAMP PROVIDING POLARIZED LIGHT

CROSS-REFERENCE TO PRIOR APPLICATIONS

This application is the U.S. National Phase application under 35 U.S.C. § 371 of International Application No. PCT/EP2024/052038, filed on Jan. 29, 2024, which claims the benefit of European Patent Application No. 23155026.0, filed on Feb. 6, 2023. These applications are hereby incorporated by reference herein.

FIELD OF THE INVENTION

The invention relates to a LED filament lamp for emitting polarized light.

BACKGROUND OF THE INVENTION

US 2015/101246 A1 discloses an illumination apparatus for plant cultivation, including a unit configured to change light in any wavelength region of 300 nm or higher and 600 nm or lower (wavelengths of 452 nm to 474 nm, for example) to light in the wavelength region having dominantly a right-circularly polarized light component. The illumination apparatus enables irradiation with light that is capable of giving a specific effect in plant cultivation. The illumination apparatus is thus essentially a LED lamp providing polarized light.

A trend in lighting is the use of LED filament lamps. The LED filament lamps may be used for retrofitting purpose, such as a LED lamp which is designed to resemble a traditional incandescent light bulb with a visible filament for aesthetic and light distribution purposes, and with the high efficiency of light-emitting diodes. Especially decorative bulbs are difficult to resemble when using LED, such as spiral filament light bulb may often lack authenticity. Users often dislike the light emitting from a LED filament lamp when the LED filament lamp is compared to the well-known traditional Edison lamp.

SUMMARY OF THE INVENTION

It is an object of the present invention to overcome this problem by improve performance and/or appearance of light emitting diode, LED, filament lamps.

According to a first aspect of the invention, this and other objects are achieved by presenting a LED filament lamp for providing polarized LED filament lamp light, wherein the LED filament lamp comprises:

- a LED filament having a plurality of LEDs arranged on a filament carrier, wherein the LED filament is configured to emit LED filament light, and wherein the LED filament is configured to be arranged in the LED filament lamp,
- light exit window, and
- a polarizer fully or partially enclosing the LED filament, wherein the polarizer is configured to polarize at least part of the LED filament light into polarized LED filament light, such that at least part of the polarized LED filament light is emitted through the light exit window as the polarized LED filament lamp light.

An LED filament lamp, also meaning a LED filament light bulb, is an LED lamp which is designed to resemble a traditional incandescent light bulb with visible filaments for aesthetic and light distribution purposes. The LED filament lamp has a high efficiency when using the technology of LED or any solid-state lighting. The LED filament lamps may easily be a replacement for conventional incandescent bulbs, as LED filament lamp may be provided with a similar envelope shape and base as conventional incandescent bulb. Furthermore, the LED filament lamp may work with a plurality of different supply voltage, which may be predetermined for an application purpose. The LED filament lamp may provide an angle of light distribution similar to the conventional incandescent bulb.

The LED filament comprise a plurality of LEDs arranged on a filament carrier. The LED filament may be elongated and have a longitudinal axis. The filament carrier is configured to carry a plurality of LEDs. The LEDs may be connected to the filament carrier in a direction along the filament carrier. The filament carrier may be a plate having a first and a second side. The LEDs may be arranged on a first side on the filament carrier plate, or the LEDs may be arranged on both sides of the plate. The LEDs may be electrical connected via the filament carrier to a power source.

The LEDs may be electrical connected to a power source via electrical connections along the carrier. The elongated filament carrier may comprise LEDs, which is electrical connected in series- and/or parallel-connected strings of LEDs, such that the LEDs may resemble in appearance the filaments of for examples an incandescent light bulb.

A polarizer having a polarization direction is arranged in a position where the polarizer encloses or partially encloses the filament carrier and the plurality of LEDs. such that the light emitted from the LED filament is at least partially polarized. The polarizer may enclose for at least 60% of the LED filament. Preferably at least 70% of the polarizer may enclose the LED filament. More preferably at least 80% of the polarizer may enclose the LED filament. Most preferably at least 90% of the polarizer may enclose the LED filament. The LED filament may alternatively be fully enclosed by the polarizer.

The term polarized LED filament lamp light is intended to mean that the light exiting the light exit window is polarized light or substantially polarized light. Substantially polarized light means that in an operational mode at least 90% of the light exiting the light exit window is polarized light. The light exiting the light exit window may preferably be at least 95% polarized light. More preferably at least 98% of the light exiting the light exit window is polarized light. Most preferably at least 99% of the light exiting the light exit window is polarized light, such as, e.g., 100% of the light exiting the light exit window is polarized light.

The polarizer may be arranged in a position relative to the LED filament, such that the polarizer lets the light or part of the light from the LEDs of a specific polarization pass through, while blocking other polarizations in the light emitted from the LEDs.

The polarized light may have a first polarization direction relative to a longitudinal direction of the LED filament lamp. The polarized light may alternatively have a second polarization direction relative to the longitudinal direction of the LED filament lamp, wherein the second polarization direction is different from the first polarization direction.

A first polarizer providing the first polarization direction and a second polarizer providing a second polarization direction may be arranged relative to the LED filament. The first polarization direction may be different from the second polarization direction. In another embodiment the first polarization direction may be substantially equal to the second polarization direction. In this way, a larger position of the first LED filament is covered with one or more polarizers. The filament carrier may be rigid, e.g. made from glass, metal, quartz, sapphire, etc. Alternatively, the filament carrier may be substantially flexible, such that the filament may be bendable. The filament carrier may be light transmissive, which will provide a translucent reflection through the career, which may provide a decorative effect when the LED filament is emitting light.

In an embodiment of the invention, the LED filament comprises an elongated encapsulant covering or encapsulating the plurality of LEDs, the encapsulant comprises a luminescent material configured to at least partly convert LED light emitted by the plurality of LEDs into converted light.

The LED filament may be a filament carrier provided with an encapsulant. The LED filament comprises an elongated encapsulant covering or encapsulating the plurality of LEDs. The encapsulant may comprise a luminescent material, wherein the luminescent material may be configured to at least partly convert LED light emitted by the plurality of LEDs into converted light.

In an embodiment of the invention, the polarizer is a reflective polarizer.

The reflective polarizer may be arranged as a tubular shaped cover enclosing or partially enclosing the filament carrier with the encapsulant. The filament carrier may be an elongated filament carrier provided with an elongated encapsulant. The reflective polarizer may for example be glued to the encapsulant. The reflective polarizer may be a round or polygonal shaped polariser, such that the reflective polarizer transmits the desired polarization and reflect the rest of the light in another direction.

In an embodiment of the invention, the polarizer is a flexible reflective polarizer.

The polarizer may be formed as a substantially tight tube around the filament carrier with the elongated encapsulant. The polarizer may be a flexible reflective polarizer. Depending on the orientation of the flexible reflective polarizer, the reflection of the light can be arranged differently for changing intensity or contrast of the light emitting from the LED filament lamp.

The flexible polarizer may be attached to the encapsulant. The flexible polarizer may be a flexible reflective polarizer. The flexible reflective polarizer may for example be glued to the encapsulant. Alternatively, the polarizer may for example be a film wrapped around the elongated encapsulant. At least one polarizer may be arranged in a spiralized arrangement relative to the elongated filament carrier comprising the elongated encapsulant. The polarizer may be arranged in a spiralized arrangement, such that part of the light emitted from the LED filament lamp is a polarized light.

In a further embodiment of the invention, a quarter-wave plate is arranged relative to the polarizer.

A quarter-wave plate may be arranged in a position relative to of the polarizer; the quarter-wave plate may be arranged along the polarizer. Alternatively, the quarter-wave plate may be arranged around the polarizer to make circular polarized light. A quarter-wave foil may be used as an alternative to a quarter-wave plate. The provides a decorative effect when the LED filament is emitting light, for example when using a reflective polarizer. A cholesterics effect may be sued as well, for example when using liquid crystals.

In a still further embodiment of the invention, the LED filament is a linear LED filament, wherein the polarizer is arranged in a curved position at least partly around the linear LED filament.

The LED filament may be a linear LED filament having a longitudinal direction. A polarizer may be arranged in a curved position at least partly around the linear LED filament. A linear elongated filament carrier may be comprised in a long strait LED filament. The filament carrier may comprise a carrier plate. The linear elongated carrier plate may comprise a plurality of LEDs mounted in a long row on the first side of the elongated carrier plate. Alternative, the plurality of LEDs may be mounted in a long row on both or all sides of the elongated carrier, emitting light substantially around the elongated carrier plate.

The elongated filament carrier may be shaped as a curved filament carrier or the filament carrier may comprise a curved part. The curved LED filament may for example be shaped as a spiral curved LED filament arranged in a spiralized arrangement relative to the longitudinal axis of the LED filament lamp. The curved filament carrier may be used to enhance a decorative effect in a LED lamp or LED filament lamp.

In a still further embodiment of the invention, the LED filament has a spiral or helix shape, and wherein the polarizer is arranged in a spiral or helix shaped position relative to the LED filament, or wherein the polarizer is arranged in a curved position at least partly around the LED filament.

The curved elongated LED filament may for example be shaped as a spiral curved LED filament arranged in a spiralized arrangement relative to the longitudinal axis of the LED filament lamp. The curved LED filament arranged in the LED filament may provide a predetermined visual lighting effect in use. The curved LED filament may comprise a flexible polarizer or a flexible reflective polarizer. Because of only having flexibility in a first direction, the flexible polarizer or flexible reflective polarizer may be arranged around the spiral curved LED filament in a spiralized manner. Alternative the polarizer may be arranged in the middle of the spiral curved LED filament, such that the spiral curved LED filament is arranged around the polarizer in a spiralized manner. The LED filament lamp may comprise at least one curved LED filament or partially curved LED filament.

In a further embodiment of the invention, the LED filament lamp comprises a base cap for electrically and mechanically connecting the LED filament lamp to a socket of a luminaire, wherein the LED filament lamp comprises an envelope enclosing a volume, wherein the LED filament, and the polarizer are arranged in the volume.

The LED filament comprises at least one electrical connection, which can electrical connected to a power source. The LED filament may also comprise a mechanical connection, such that the LED filament may be attached to a luminaire or base cap for a socket of a luminaire. The control device may comprise the LED driver. The electrical connection may be connected to a LED driver and/or a control device. The control device may control the LED driver which is driving the LEDs comprised in the LED filament or LED filaments. The control device is in electrical communication with the elongated LED filament, and the control device is configured to vary a luminous flux emitting from the LED filament. The control device may control the luminous flux from at least one LED filament. By individually controlling the luminous flux, the LED filament light reflections on the cover surface of the LED filament lamp can be reduced for improved visibility of the LED filament or enhanced for a flame-like appearance, depending on the predetermined application wherein the LED filament lamp is to be used.

The LED driver and/or control device may be located in a base housing, which may fully or partially be arranged in the base cap. The base cap may be adaptable for a socket. The socket may provide power to the LED filaments inside the LED filament lamp.

The LED filament lamp comprises an envelope enclosing a volume, wherein the LED filament and/or the polarizer are arranged in the volume. The envelope may comprise one or more light exit windows.

The polarizer may be fixed in a predetermined position inside the envelope. The LED filament lamp comprises the envelope, wherein the LED filament is arranged in the volume. The LED filament lamp may comprise a polarizer arranged in the volume, wherein the polarizer may be attached to an inner surface of the envelope. The polarizer may be attached to the inner surface of the light exit window comprised in the envelope. The polarizer may for example be easily be glued or in another way fastened to the inner surface of the envelope.

In a still further embodiment of the invention, the polarizer has a cylinder-like shape.

The envelope of the LED filament lamp may have a tubular shape. The polarizer may have a cylinder-like shape, such that the polarizer easily fits into a tubular shaped envelope. Part of the envelope may be a tubular shaped or a semitubular shaped light exit window. The polarizer may be attached to an inner surface of the envelope. The polarizer may be attached to an inner surface of the envelope, which may be the light exit window. A tubular light source is commonly used in street lighting, floodlighting, warehousing and other commercial applications, where a high light output and efficiency is essential. The LED filament may be arranged in a predetermined position inside the envelope. The tubular envelope may provide a predetermined visual lighting effect, when in use. The LED filament lamps may provide a light emitted in at least one direction perpendicular to the longitudinal direction of the tubular envelope. The polarized LED filament light is emitted through the light exit window as the polarized LED filament lamp light.

The LED filament lamp can be used for illumination and/or decorative effect. The LED filament lamp may be arranged in a socket in a luminaire. Alternatively, the LED filament lamp may be arranged in a socket, such that the LED filament lamp is a luminaire. The LED filament lamp comprises an encapsulated volume having an envelope. The LED filament lamp comprises at least one LED filament, wherein at least one of the at least one LED filament is an elongated LED filament. The LED filament lamp may be a retrofit LED filament lamp. The LED filament lamp may comprise a base cap for a retrofit socket or a standardised socket.

The LED filament lamp may comprise an elongated envelope, proving the LED filament lamp with a longitudinal axis. The LED filament is arranged in a predetermined position inside the encapsulated volume. The LED filament may be configured to emit polarized light having a polarization direction.

In an embodiment of the invention, a longitudinal axis of the LED filament is arranged in an angled position relative to a longitudinal axis of the LED filament lamp, wherein a polarization direction of the polarized LED filament light is non-parallel and non-perpendicular to the longitudinal axis the LED filament.

The LED filament may be an elongated LED filament having a longitudinal axis. The elongated LED filament may be arranged inside the encapsulated volume of the LED filament lamp. The elongated LED filament may be configured to emit a polarized light. The elongated LED filament emits a polarized light relative to the longitudinal axis of the elongated LED filament. The longitudinal axis of the elongated LED filament may be arranged in a non-parallel or a non-perpendicular position to LED filament lamp's longitudinal axis. Alternatively, the polarization direction of the polarized LED filament light may be parallel or perpendicular to the longitudinal axis the LED filament.

The LED filament is arranged in an angled position relative to the longitudinal axis of the LED filament lamp. The angled position may be 20-70 degrees relative to longitudinal axis the LED filament lamp. The angled position may be 25-60 degrees relative to longitudinal axis the LED filament lamp. The angled position may be 30-60 degrees relative to longitudinal axis the LED filament lamp.

The longitudinal axis of the elongated LED filament may be arranged in a parallel position to LED filament lamp's longitudinal axis, such that the LED filament emits a polarized light in a first polarized direction. The elongated LED filament is arranged in an angled position relatively to LED filament lamp longitudinal axis, such that the LED filament emits a polarized light in a second polarized direction. The second polarized direction is different from the first polarized direction. At least 80% of the LED filament lamp light may be linearly or circular polarized light. Preferably at least 85% of the LED filament lamp light may be linearly or circular polarized light. More preferably at least 90% of the LED filament lamp light may be linearly or circular polarized light. Most preferably at least 95% of the LED filament lamp light may be linearly or circular polarized light.

The LED filament lamp may comprise at least one elongated LED filament arranged in an angled position relative to the longitudinal axis of the LED filament lamp. The LED filament lamp may comprise a displacement of an elongated LED filament relative to the longitudinal axis of the LED filament lamp. LED filament may have a longitudinal axis, which is arranged at an angled position to the longitudinal axis of the LED filament lamp, when being displaced. The polarization direction of the polarizer arranged relative to the LED filament may also be arranged, such that the angle of the polarization direction is +/−90°. In this way, the polarization direction may be parallel or perpendicular to the longitudinal axis of the LED filament lamp.

In a further embodiment of the invention, wherein the LED filament lamp comprises an encapsulant, wherein the encapsulant is arranged relative to the LED filament, and wherein the polarizer is in optical contact with the encapsulant.

The LED filament may be enclosed or partly enclosed by an encapsulant. The polarizer may be arranged in a predetermined position relative to the LED filament and/or the encaptulant, such that the encapsulant is in optical communication with the encapsulant. The predetermined position of the polarizer relative to the encaptulant can be provided for optimizing the optical performance of the LED filament lamp.

The encapsulant may be luminescent. The encapsulant may comprise more or less luminescent material. The encapsulant is configured to fully enclose or partially enclose the plurality of LEDs or part of the LEDs. The luminescent encapsulant is configured to convert the LED filament light into a converted light. The encapsulant may be an elongated encapsulant. The hole or part of the encapsulant may comprise a luminescent material, such that the light from the LEDs is fully converted or partially converted. One or more polarizers may fully enclose or partially encloses the elongated encapsulant, such that the light or part of the light emitted from the LED filament is polarized light. The converted light is the transmitted through a polarizer into a converted polarized light, which then emits from the LED filament lamp.

In a still further embodiment of the invention, the polarizer is arranged at a predetermined distance from the LED filament.

The polarizer may be arranged at a predetermined distance different from zero from the LED filament. The distance between the polarizer and the LED filament may be at least 3 mm. The distance between the polarizer and the LED filament may be larger, preferably at least 6 mm. More preferably, the distance between the polarizer and the LED filament may be at least 10 mm. Most preferably at least 15 mm, e.g. 20 mm between the polarizer and the LED filament. For example the LED filament is in the center of the LED filament lamp, and the polarizer polarizer is attached to an inner surface of the envelope. This provides a distance between the polarizer and the LED filament.

In a still further embodiment of the invention, the LED filament lamp comprises at least one of the LED filament configured to emit light having a first polarization direction parallel to a longitudinal axis of the first LED filament lamp, and at least one further LED filament configured to emit light having a second polarization direction perpendicular to the longitudinal axis of the LED filament lamp, and wherein the LED filament lamp comprise a controller for individually controlling the LED filament and the further LED filament.

The controller is capable of controlling the LED filaments individually during use. The predetermined distance of the polarizer relative to the LED filament can be provided for optimizing the optical performance of the LED filament lamp. By controlling the LED filaments individually the optical performance of the LED filament lamp may be altered during use.

A LED filament lamp may comprise at least two elongated LED filaments. The first elongated LED filament and the second elongated LED filament may be arranged parallel or in an angled position to each other. The first elongated LED filament and the second elongated LED filament are also arranged relative to the longitudinal axis of the LED filament lamp. The first elongated LED filament may comprise a first polarizer, which provides a first polarization direction. The second elongated LED filament may comprise a second polarizer providing a second polarization direction. The second polarization direction may be similar to the first polarization direction. Alternatively, the second polarization direction may be different from the first polarization direction. The LED filaments comprises an electrical connection, which is connected to a control device located inside the base housing. The base housing may be attached to the base cap for a socket.

By individually controlling both the first and second LED filament's reflections, the LED filaments light reflections on the cover surface of the LED filament lamp can be reduced for improved visibility of the LED filament and/or enhanced for a flame-like appearance. The reflections depend on the predetermined application wherein the LED filament lamp is to be used in.

The LED filament lamp may be controlled such that in a first operational mode only one or more first LED filaments proving p-polarized light are electrically activated, and in a second operational mode only one or more second LED filaments proving s-polarized light are electrically activated. The LED filament lamp can switch between p and s polarized light when electrically controlling the LED filaments.

In another example, the LED filament lamp may be controlled such that in a first operational mode only one or more first LED filaments proving p-polarized light are electrically activated or only one or more second LED filaments proving s-polarized light are electrically activated. In a second operational mode, the LED filament lamp may be controlled such that both the first and second LED filaments may be electrically activated at the same time. In this way the LED filament lamp can switch between polarized light i.e. p- and s-polarized light and non-polarized light.

In a still further embodiment of the invention, the LED filament lamp comprise a first LED filament having a first longitudinal direction and a second LED filament having a first longitudinal direction, wherein the first and second LED filaments have a similar polarizer, such that the light emitting from each of the LED filaments have the same polarization direction, wherein the first and second LED filaments are arranged at an angle β with respect to the first and second longitudinal direction of the respective LED filaments, wherein angle β is in a range from 15 to 80 degrees, and wherein the light emitting from each of the LED filaments have the same polarization direction The LED filament lamp comprises at least two elongated LED filaments. An angle β defines the angle between the first and second longitudinal axis of the respective LED filaments. Each of the LED filament may be provided with each respective polarizer. The first and second LED filaments has a similar polarizer, such that the light emitting from each of the LED filaments have the same polarization direction. Each of the LED filaments may be arranged at an angle β, which may be different from 0° relative to the longitudinal axis of each of the LED filament lamps. Alternatively, each of the LED filaments or one of the LED filament's longitudinal axis may be arranged at an angle β different from 0° relative to the other LED filament's respective longitudinal axis. The first and second LED filaments are arranged at an angle β with respect to the first and second longitudinal axis of the respective LED filaments, wherein angle β may be in a range from 15 to 80 degrees. The light emitting from each of the LED filaments have the same polarization direction.

Alternatively, the longitudinal axis of a first LED filament may alternatively be arranged in a parallel position to LED filament lamp's longitudinal axis, wherein the LED filament emits a polarized light in a first polarized direction. The longitudinal axis of a second LED filament may be arranged in an angled position relatively to LED filament lamp's longitudinal axis, wherein the second LED filament emits a polarized light in a second polarized direction. The second polarized direction is different from the first polarized direction.

The LED lamp which is provided with a LED filament as described above, provides an enhanced design to resemble a traditional incandescent light bulb for aesthetic and light distribution purposes, with a high efficiency of LED. Especially the decorative bulbs are resembling a traditional spiral light bulb without the lack of authenticity.

The invention further relates to a luminaire comprising at least one LED filament lamp according to the invention.

The LED filament lamp may be arranged in the luminaire, wherein the LED filament lamp can be used for illumination and/or decorative effects. The LED filament lamp may produce direct or indirect lighting effects. The luminaire may comprise socket, wherein the socket is configured to receive the base cap of the LED filament lamp.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1A:
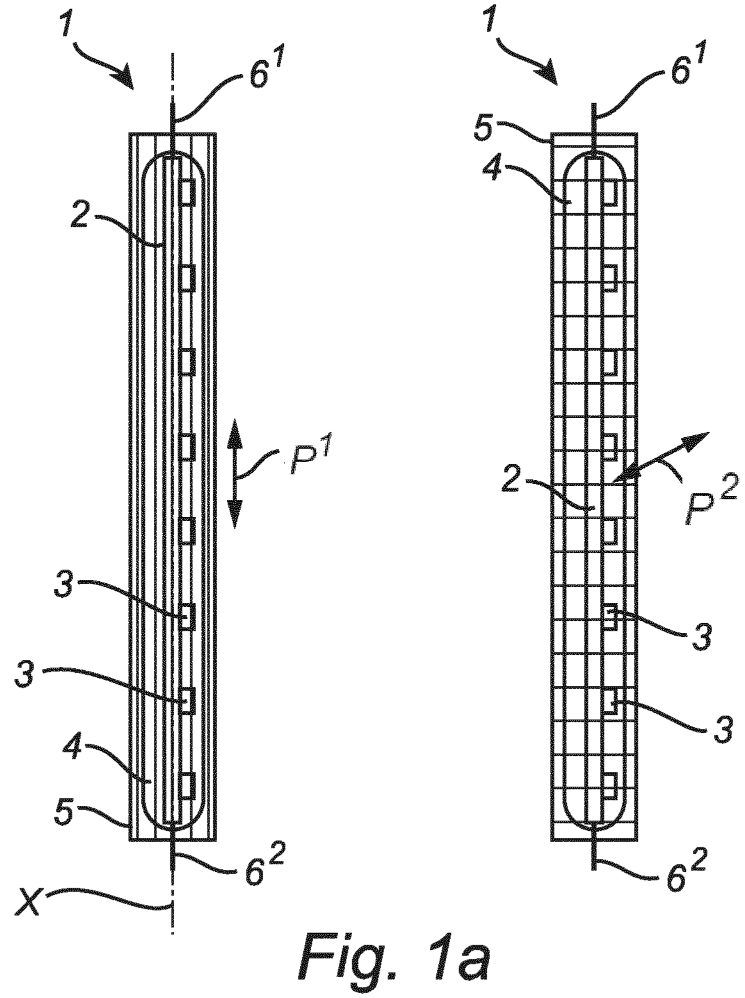
FIGS. 1*a* and 1*b* illustrates cross-sectional side views of different embodiments of elongated LED filaments of a LED lamp according to the invention.
Figure 1B:
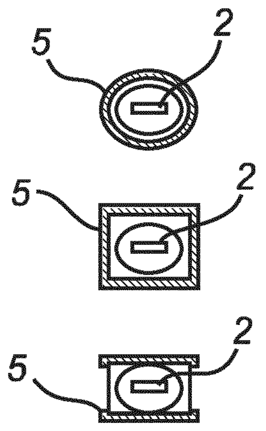

FIGS. 1*a* and 1*b* illustrates embodiments of elongated LED filaments 1 for a LED lamp 7 according to the invention. The elongated LED filament 1 comprises a plurality of LEDs 3 arranged on an elongated filament carrier 2. The elongated filament carrier 2 is formed as a linear elongated filament carrier 2. An elongated encapsulant 4 is configured to cover or partially cover the plurality of LEDs 3 or part of the LEDs 3. The elongated encapsulant 4 may comprise a luminescent material, such that the light from the LEDs 3 is converted or partly converted into a converted light. For example, the LEDs 3 may emit a blue wavelength range and the luminescent material may comprise phosphor material, such that the light converted is white light. The converted light is transmitted through the polarizer 5 into a converted polarized light, which emits from the elongated LED filament 1.

At least one polarizer 5 comprising a polarization direction encloses or partially encloses the elongated encapsulant 4, such that the light or part of the light emitted from the elongated LED filament 1 is polarized light.

The elongated LED filament has a longitudinal axis X, which extends from a first electrical connection $\mathbf{6}^1$ to a second electrical connection $\mathbf{6}^2$. The LEDs 3 may be electrical connected to a power source via the electrical connections $\mathbf{6}^1$,$\mathbf{6}^2$.

The elongated filament carrier 2 is configured to carry the LEDs 3. The LEDs 3 is attached to the filament in a direction along the filament carrier 1. The LEDs 3 is arranged on a first side on the elongated filament carrier 2. The LEDs 3 provides a substantially semi-cylindrical illumination with a polarized light.

FIG. 1*a* illustrates a first and a second embodiment of an elongated LED filament 1. The first embodiment (left hand side of FIG. 1*a*) of the elongated LED filament 1 comprise a polarizer 5 providing a polarized light having a first polarization direction $P^1$, illustrated with the arrow, parallel to the longitudinal axis X of the elongated LED filament 1. The second embodiment (right hand side of FIG. 1*a*) of a second elongated LED filament 1 comprises a polarizer 5 providing a polarized light having a second polarization direction $P^2$, illustrated with the arrow, having an angle different from zero to the longitudinal axis X of the elongated LED filament 1. The second polarization direction $P^2$ is different from the first polarization direction $P^1$. The elongated LED filament 1 may be integrated in a LED filament lamp or similar. Depending on the orientation of the first polarization direction $P^1$ relative to the second polarization direction $P^2$, the LED filament light reflections on cover surface of a LED filament lamp can either be reduced for improved visibility of the LED filament 1 or enhanced for a flame-like appearance, depending on the predetermined application wherein the LED filament lamp is being used.

FIG. 1*b* illustrates three different cross-sectional shapes of an elongated LED filament 1. The elongated filament carrier 2 may be an elongated carrier plate encapsulated by an encapsulant. The polarizer 5 is arranged as a cross-sectional tubular shaped cover enclosing or partially enclosing the elongated filament carrier 2 with the elongated encapsulant, cf. the uppermost part of FIG. 1*b*. Alternatively, the polarizer may have a cross-sectional shape which is round or polygonal shaped cover, cf. the middle part of FIG. 1*b*. Furthermore, the polarizer may have a cross-sectional shape provided by a first and a second flat elongated polarizer 5 arranged on opposite sides of the elongated filament carrier 2, cf. the lowermost part of FIG. 1*b*. The first and the second polarizer 5 may have different polarization direction.

Figure 2:
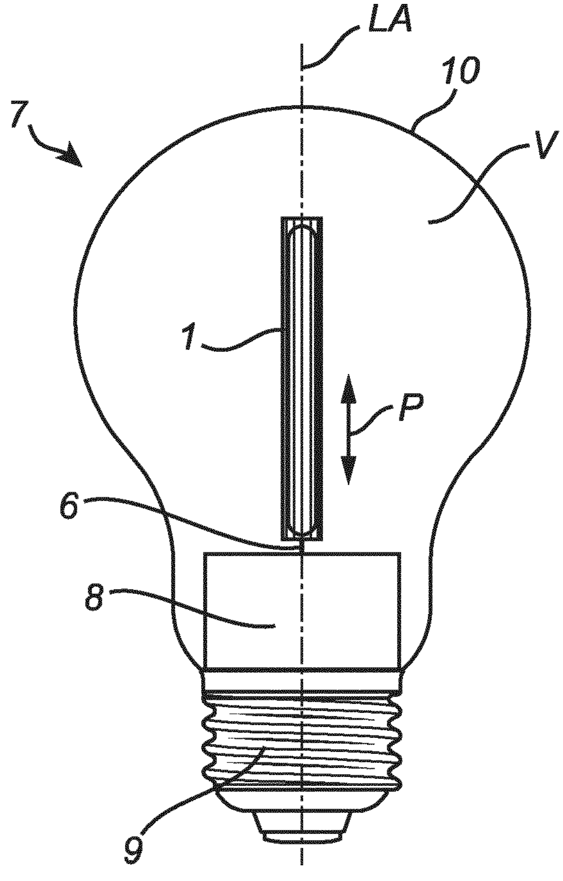
FIG. 2 illustrates a cross-sectional view of an embodiment of a LED filament lamp according to the invention and comprising an elongated LED filament.

FIG. 2 illustrates an embodiment of an LED filament lamp 7 comprising an elongated LED filament 1. LED filament lamp 7 is a retrofit lamp for illumination. The LED filament lamp 1 comprises an encapsulated volume V having a cover surface 10. The LED filament lamp 7 has a longitudinal axis LA. The elongated LED filament 1 is arranged inside the encapsulated volume V, and the elongated LED filament 1 extends parallel to the longitudinal axis LA of the LED filament lamp 7. The elongated LED filament 1 is configured to emit light having a polarization direction P, illustrated with the arrow.

The LED filament 1 comprises an electrical connection 6, which can electrical connected to a LED driver 8, which is electrical connected to a base 9 for a socket. The LED filament 1 may also comprises a mechanical connection, such that the LED filament may be attached to the housing of the LED driver 8.

Figure 3:
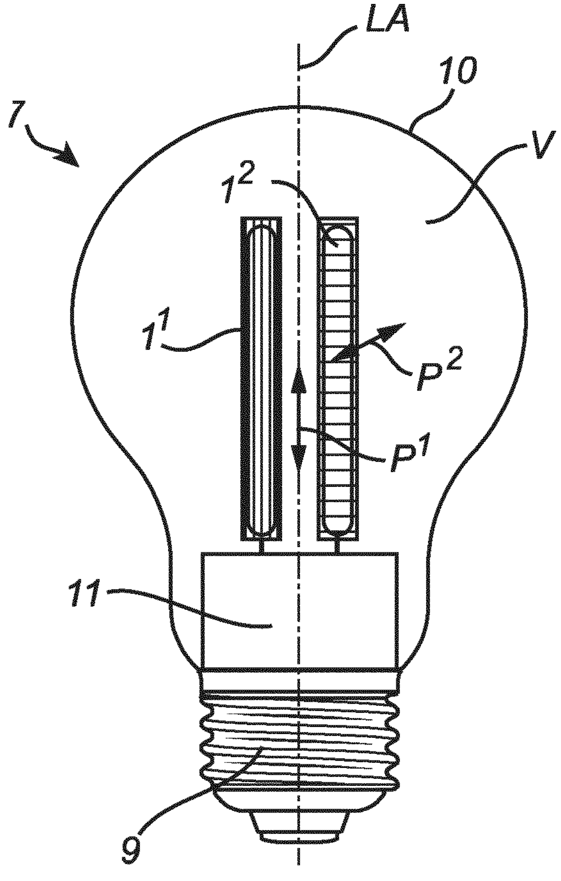
FIG. 3 illustrates a cross-sectional view of an embodiment of a LED filament lamp according to the invention and comprising two elongated LED filaments.

FIG. 3 illustrates an embodiment of a LED filament lamp 7 comprising two elongated LED filaments $\mathbf{1}^1$, $\mathbf{1}^2$. The first elongated LED filament $\mathbf{1}^1$ and the second elongated LED filament $\mathbf{1}^2$ are arranged parallel to each other. The first elongated LED filament $\mathbf{1}^1$ and the second elongated LED filament $\mathbf{1}^2$ are also arranged parallel the longitudinal axis LA of the LED filament lamp 7. The first elongated LED filament $\mathbf{1}^1$ comprise a first polarizer which provides light with a first polarization direction $P^1$, illustrated by the arrow.

The second elongated LED filament $1^2$ comprise a second polarizer providing light with a second polarization direction $P^2$, illustrated by the arrow. The second polarization direction $P^2$ is different from the first polarization direction $P^1$. The LED filaments $1^1$, $1^2$ each comprise an electrical connection, which is connected to a control device 11 located in the housing which is attached to the base 9 for a socket.

By individually controlling both the first and second LED filament $1^1$, $1^2$ reflections, the LED filament light reflections on the cover surface 10 of the LED filament lamp 7 can be reduced for improved visibility of the LED filament 1 and enhanced for a flame-like appearance, depending on the predetermined application wherein the LED filament lamp is to be used in.

Figure 4:
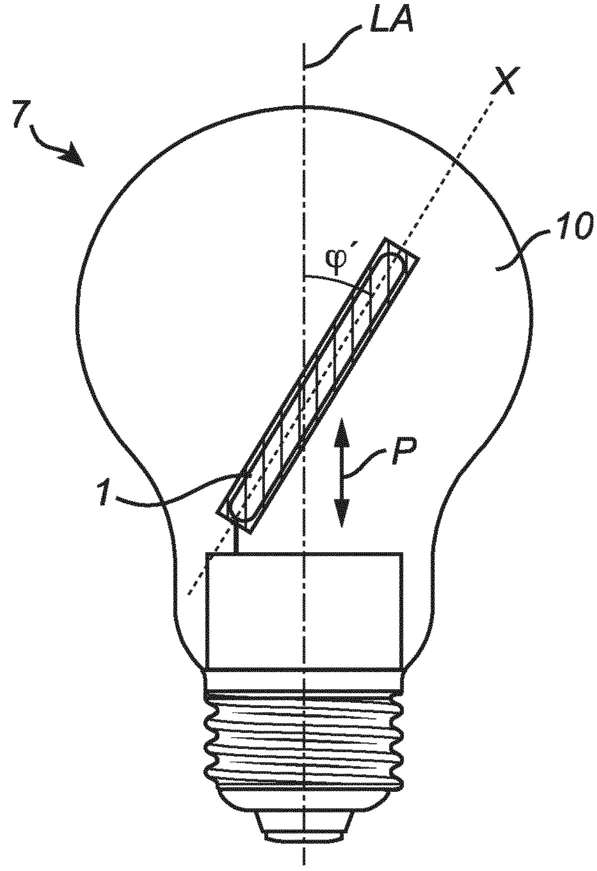
FIG. 4 illustrates a cross-sectional view of an embodiment of a LED filament lamp according to the invention and comprising a displaced elongated LED filament.

FIG. 4 illustrates an embodiment of a LED filament lamp 7 comprising a displaced elongated LED filament 1. The longitudinal axis X of the LED filament is arranged at an angle φ' to the longitudinal axis LA of the LED filament lamp 7. The polarization direction P of the light provided by the polarizer arranged on the LED filament 1 is arranged such that the angle is φ' or φ'+90°. In this way, the polarization direction P is parallel or perpendicular to the longitudinal axis LA of the LED filament lamp 7.

Figure 5:
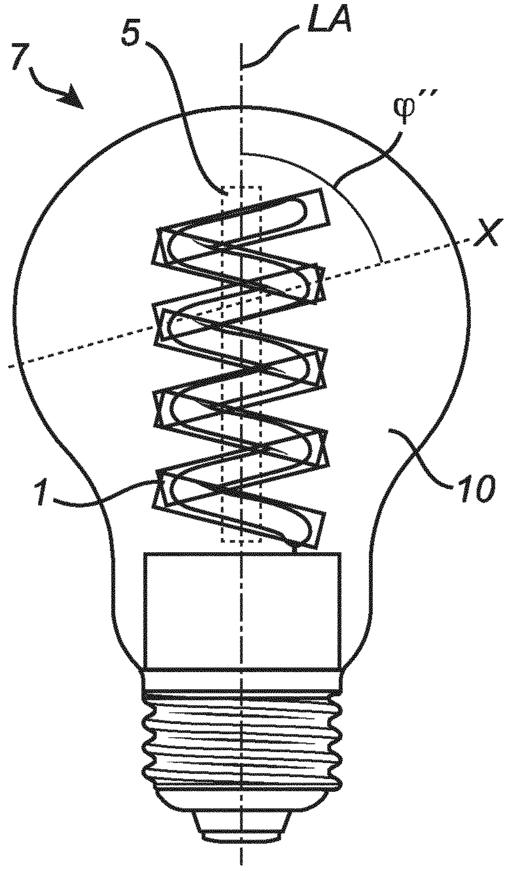
FIG. 5 illustrates a cross-sectional view of an embodiment of a LED filament lamp according to the invention and comprising a spiral curved elongated LED filament.

FIG. 5 illustrates an embodiment of a LED filament lamp 7 comprising a spiral curved LED filament 1. The spiral curved LED filament 1 is arranged in a spiralized arrangement relative to the longitudinal axis LA of the LED filament lamp 7. The spiral curved LED filament 1 may comprise a flexible polarizer or a flexible reflective polarizer 5. Because the LED filament 1 only has flexibility in a first direction, the polarizer 5 may be arranged around the spiral curved LED filament in a spiralized manner. Alternatively, the polarizer 5 may be arranged in the middle of the spiral curved LED filament along the longitudinal axis LA of the LED filament lamp 7, such that the spiral curved LED filament is arranged around the polarizer 5 in a spiralized manner. Alternatively, a first polarizer may be arranged around the spiral curved LED filament in a spiralized manner and the second polarizer may be arranged in the middle of the spiral curved LED filament along the longitudinal axis LA of the LED filament lamp 7, and the spiral curved LED filament is arranged around the polarizer in a spiralized manner.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measured cannot be used to advantage.

The invention claimed is:

1. A LED filament lamp for providing polarized LED filament lamp light, wherein the LED filament lamp comprises:

a LED filament having a plurality of LEDs arranged on a filament carrier, wherein the LED filament is configured to emit LED filament light, and wherein the LED filament is configured to be arranged in the LED filament lamp;

an envelope having a light exit window; and a polarizer fully or partially enclosing the LED filament, wherein the polarizer is configured to polarize at least part of the LED filament light into polarized LED filament light, such that at least part of the polarized LED filament light is emitted through the light exit window as the polarized LED filament lamp light, and wherein the polarizer is a reflective polarizer.

2. The LED filament lamp according to claim 1, wherein the LED filament comprises an elongated encapsulant covering or encapsulating the plurality of LEDs, the encapsulant comprises a luminescent material configured to at least partly convert LED light emitted by the plurality of LEDs into converted light.

3. The LED filament lamp according to claim 1, wherein the polarizer is a flexible reflective polarizer.

4. The LED filament lamp according to claim 1, wherein a quarter-wave plate is arranged downstream of the polarizer.

5. The LED filament lamp according to claim 1, wherein the LED filament is a linear LED filament, wherein the polarizer is arranged in a curved position at least partly around the LED filament.

6. The LED filament lamp according to claim 1, wherein the LED filament has a spiral or helix shape, and wherein the polarizer is arranged (i) in a spiral or helix shaped position relative to the LED filament, or (ii) in a curved position at least partly around the LED filament.

7. The LED filament lamp according to claim 1, wherein the LED filament lamp comprises a base cap for electrically and mechanically connecting the LED filament lamp to a socket of a luminaire, wherein the LED filament lamp comprises the envelope enclosing a volume, wherein the LED filament and the polarizer are arranged in the volume.

8. The LED filament lamp according to claim 1, wherein the polarizer is attached to an inner surface of the envelope.

9. The LED filament lamp according to claim 1, wherein a longitudinal axis of the LED filament is arranged in an angled position relative to a longitudinal axis of the LED filament lamp, wherein a polarization direction of the polarized LED filament light is non-parallel and non-perpendicular to the longitudinal axis of the LED filament.

10. The LED filament lamp according to claim 1, wherein the LED filament comprises an elongated encapsulant covering or encapsulating the plurality of LEDs, and wherein the polarizer is in optical contact with the encapsulant.

11. The LED filament lamp according to claim 1, wherein the polarizer is arranged at a predetermined distance from the LED filament.

12. The LED filament lamp according to claim 1, wherein the LED filament lamp comprises at least one of the LED filament configured to emit light having a first polarization direction parallel to a longitudinal axis of the LED filament lamp, and at least one further LED filament configured to emit light having a second polarization direction perpendicular to the longitudinal axis of the LED filament lamp, and wherein the LED filament lamp comprise a controller for individually controlling the LED filament and the further LED filament.

13. The LED filament lamp according to claim 1, wherein the LED filament lamp comprises a first LED filament having a first longitudinal axis and a second LED filament having a second longitudinal axis, wherein the first and second LED filaments has a similar polarizer, such that the light emitting from each of the LED filaments have the same polarization direction, wherein the first and second LED filaments are arranged at an angle β with respect to the first and second longitudinal axis of the respective LED filaments, wherein angle β is in a range from 15 to 80 degrees.

14. The LED filament lamp according to claim 1, wherein the polarizer has a cylinder-like shape.

15. A luminaire for illumination, wherein the luminaire comprises at least one LED filament lamp according to claim 1.

* * * * *